(12) United States Patent
Yao et al.

(10) Patent No.: US 6,937,798 B1
(45) Date of Patent: Aug. 30, 2005

(54) OPTICAL SPECTRUM MONITOR

(75) Inventors: X. Steve Yao, Diamond Bar, CA (US); Yongqiang Shi, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 7 days.

(21) Appl. No.: 10/759,522

(22) Filed: Jan. 15, 2004

Related U.S. Application Data

(60) Provisional application No. 60/441,112, filed on Jan. 17, 2003.

(51) Int. Cl.[7] .............................................. G02B 6/26
(52) U.S. Cl. ...................... 385/48; 372/20; 359/341.41
(58) Field of Search ................................ 385/27, 31, 39, 385/47, 48, 149; 372/20, 32, 50, 26; 702/61; 359/341.41, 341.4, 334

(56) References Cited

U.S. PATENT DOCUMENTS

| | | | |
|---|---|---|---|
| 5,301,101 A | * | 4/1994 | MacArthur et al. ........... 700/36 |
| 5,894,362 A | * | 4/1999 | Onaka et al. ................. 398/95 |
| 6,104,492 A | * | 8/2000 | Giles et al. ................. 356/454 |
| 6,246,818 B1 | * | 6/2001 | Fukushima .................... 385/47 |
| 6,339,405 B1 | * | 1/2002 | Gleener ...................... 343/795 |
| 6,351,323 B1 | * | 2/2002 | Onaka et al. ................. 398/84 |
| 6,417,965 B1 | * | 7/2002 | Ye et al. ................. 359/341.41 |
| 6,583,900 B2 | * | 6/2003 | Onaka et al. ................. 398/59 |
| 6,724,526 B1 | * | 4/2004 | Onaka et al. ............. 359/337.1 |
| 6,785,042 B1 | * | 8/2004 | Onaka et al. ............... 359/334 |
| 2002/0101633 A1 | * | 8/2002 | Onaka et al. ............... 359/119 |
| 2003/0095736 A1 | * | 5/2003 | Kish et al. .................... 385/14 |
| 2004/0252999 A1 | * | 12/2004 | Onaka et al. ............... 398/177 |
| 2005/0013330 A1 | * | 1/2005 | Kish et al. .................... 372/26 |
| 2005/0013331 A1 | * | 1/2005 | Kish et al. .................... 372/32 |
| 2005/0013332 A1 | * | 1/2005 | Kish et al. .................... 372/32 |
| 2005/0018720 A1 | * | 1/2005 | Kish et al. .................... 372/20 |
| 2005/0018721 A1 | * | 1/2005 | Kish et al. .................... 372/20 |

* cited by examiner

Primary Examiner—Akm Enayet Ullah
(74) Attorney, Agent, or Firm—Fish & Richardson P.C.

(57) ABSTRACT

Devices and techniques for monitoring spectrum of light. For example, a fiber spectral monitoring device and associated technique are described for monitoring spectral information in light based on an interferometer design.

17 Claims, 1 Drawing Sheet

OPTICAL SPECTRUM MONITOR

This application claims the benefit of U.S. Provisional Patent Application No. 60/441,112 of the same title filed on Jan. 17, 2003, the disclosure of which is incorporated herein by reference as part of this application.

BACKGROUND

Optical signals may have optical spectral components at one or more wavelengths within the electromagnetic spectrum. Optical spectral components at different wavelengths may include useful information such as properties of a light source, an optical material, device or transmission media. In various applications, it may be desirable to analyze the optical spectral components of an optical signal.

SUMMARY

This application includes optical devices and techniques for monitoring spectral components in optical signals. Such devices and techniques can be used in a wide range of applications where the spectral information of light is important. For example, in fiber optical communication systems, it may be desirable to analyze and monitor WDM and DWDM channels at different channel wavelengths, or to obtain spectral information of a particular signal, such as a DWDM channel, to analyze dispersion effects in that signal.

In one implementation, for example, a spectrum monitoring device may include an input fiber to receive input light, an output fiber, a first fiber, a second fiber, and a fiber coupler. The fiber coupler has a first port coupled to the input fiber and the output fiber, and a second port coupled to the first and the second fibers to split the input light into a first beam in the first fiber and a second beam in the second fiber and to mix and couple optical signals from the first and the second fibers into the output fiber. This spectrum monitoring device in this implementation further includes a first reflector coupled to the first fiber to reflect the first beam back to the fiber coupler, and a second reflector coupled to the second fiber to reflect the second beam back to the fiber coupler. An optical detector is coupled to receive light from the output fiber to produce a detector output having information on optical interference between the first and the second beams received at the fiber coupler. An analog-to-digital converter is coupled to convert the detector output into a digital signal. This device further includes a processing device receiving and performing a FFT processing on the digital signal to extract spectral information in the input light. In addition, a fiber tuning mechanism may be coupled to at least one of the first and the second fibers to change a relative delay in the first and the beams upon reflection to back the fiber coupler.

In another implementation, a device may include an optical coupler to receive an input optical signal and to split the input optical signal into a first optical signal and a second optical signal, first and second optical paths, an optical detector, and a processing circuit. Each of the first and second optical paths receives the optical signal from the optical coupler and includes a reflector that reflects light back and makes polarization of reflected light to be orthogonal to polarization of light incident to the reflector prior to reflection. The optical detector is coupled to receive the optical output signal from the optical coupler and produces an electronic signal from the optical output signal. The processing circuit performs a fast Fourier transform on the electronic signal to extract spectral information in the input optical signal.

A method is also described as an example. In the described example, an input optical signal is split into first and second optical signals in first and second optical paths, respectively. Each of the first and second optical signals is reflected back with polarization in reflection to be orthogonal to polarization of light prior to reflection. The reflected first and second optical signals are spatially overlapped to interfere with each other to produce a mixed output optical signal which is converted into an electronic signal. A fast Fourier transform (FFT) is applied on the electronic signal to extract spectral information in the input optical signal.

These and other implementations and variations are describe in greater detail with reference to the drawings, the detailed description, and the claims.

DETAILED DESCRIPTION

Figure 1:
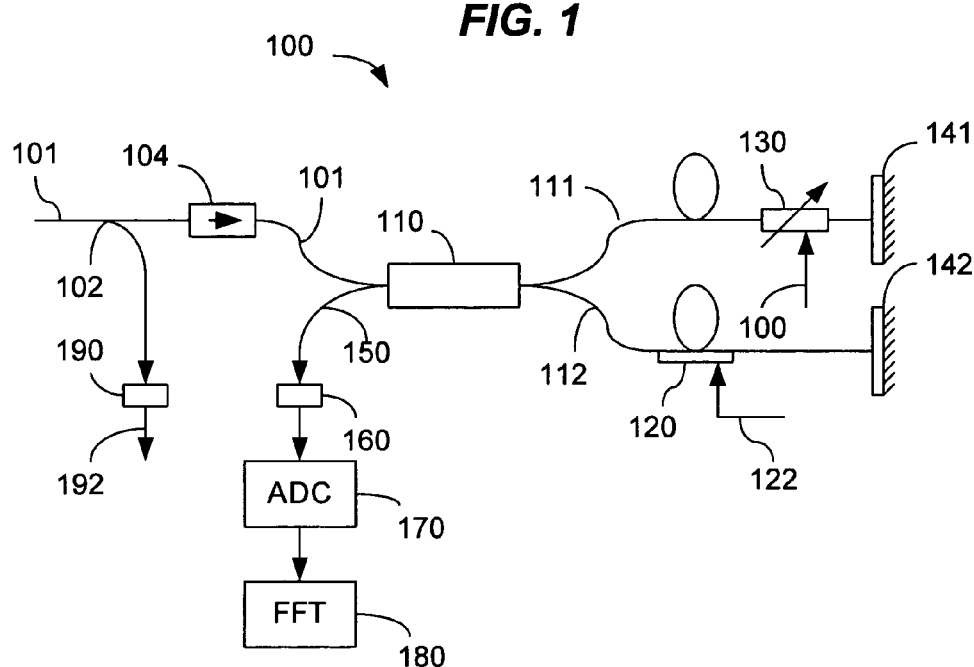
FIG. 1 shows one exemplary design of a spectral monitoring device based on optical interference and FFT processing.

FIG. 1 shows one implementation of a polarization-insensitive spectrum monitoring device 100 based on a Michaelson interferometer mechanism. The device 100 uses an input fiber 101 to receive input light under measurement. A fiber coupler 110, such as a 50% (3 dB) fiber coupler, is coupled to the input fiber 101 and an output fiber 150 on one end and is also coupled to two fibers 111 and 112 on the other end. Hence, the input light in the input fiber 101 is split between the fibers 111 and 112. The light beams received from the fibers 111 and 112 are coupled and mixed by the coupler 110. One portion of the mixed light is sent out to the output fiber 150 and the remaining portion to the input fiber 101. As illustrated, an optical isolator 104 may be coupled in the fiber 104 to eliminate the optical feedback to the input fiber 101.

The device 100 implements the Michaelson interferometer mechanism by coupling two optical reflectors 141 and 142 at the ends of the fibers 111 and 112, respectively. Hence, light beams received by the fibers 111 and 112 from the coupler 110 by splitting the input beam in the fiber 101 are reflected back by the reflectors 141, and 142, respectively. As long as the difference in the optical path lengths of the reflected beams is within the coherent length of the original input light in the fiber 101, the reflected beams, upon mixing by the coupler 110, interfere with each other so that the output beam in the fiber 150 has the interference information. This configuration is similar to the two-arm Michaelson interferometer.

Notably, each of the two reflectors 141 and 142 may be configured as a Faraday reflector by including a Faraday rotator in front of an optical reflector such as a mirror. Hence, the polarization of the reflected light is orthogonal to the polarization of the incident light to the reflector prior to the reflection. In operation, for example, this Faraday reflector operates to rotate the polarization of reflected light by 90 degrees with respect to polarization of light incident to the reflector prior to the reflection. The Faraday rotator in front of each reflector may be a 45-degree Faraday rotator which rotates the polarization by 45 degrees in a single pass. Hence, each beam coupled into the fiber 111 or 112 is reflected back by the Faraday reflector as a reflected signal beam with a polarization orthogonal to the input polarization prior to the reflection. Under this configuration, the device 100 is insensitive to the polarization variation.

A variable optical attenuator 130 may be implemented in one of the fibers 111 and 112 such as the fiber 111 as illustrated, or in both of them, to allow for adjustment of the relative power levels in the two fibers 111 and 112. In general, it may be desirable to have equal power levels in the fibers 111 and 112 to achieve a high contrast in the interference pattern in the output light in the fiber 150. The attenuator 130 may be adjustable either manually or automatically in response to a control signal 132. In addition, at least one of the fibers 111 and 112, such as the fiber 112 as illustrated, may be engaged to a fiber control device 120 to adjust the relative difference of the optical path lengths of the fibers 111 and 112 to optimize interference effect at the output in the fiber 150. The device 122 may be a fiber stretcher or a temperature controller, and may operate to change the optical path length in a fiber in response to a control signal 122.

An optical detector 160, such as a photodiode, may be coupled to the fiber 150 to receive the output light beam to produce a detector output. An analog-to-digital converter (ADC) 170 may be used to convert the detector output from the analog form into a digital signal. Next, a fast Fourier transform (FFT) device 180, which may include a microprocessor, is coupled to the ADC 170 to process the signal and to produce the spectral information of the input light in the fiber 101.

The device 100 may further include a power calibration mechanism to account for any variation in the input power in the fiber 101 during the measurement. As illustrated in FIG. 1, a fiber coupler 102 may be coupled in the fiber 101 to split a fraction of input light into an optical detector 190 that monitors the variation in the input power. The output 192 of the detector 190 may be fed to the FFT device 180 for calibrating the effects caused by the power variation.

The following describes one exemplary and simplified analytical explanation of the spectrum monitoring mechanism of the device 100. It is understood that other explanations may also be made. For simplicity, it is assumed that the input field for the input beam to the fiber 101 may be written as:

$$E_{in}(t) = E_i A(t) e^{i\omega t}.$$

After the coupling by the coupler 104 with a power-splitting ratio of $\alpha_1/\alpha_2$, two beams are generated in the fibers 111 and 112:

$$E_2 = \frac{\sqrt{\alpha_1 E_0}}{\sqrt{2}} A(t) e^{i\omega t},$$

and $$E_3 = \frac{\sqrt{\alpha_2 E_0}}{\sqrt{2}} A(t) e^{i\omega t}.$$

After reflecting back from the Faraday reflectors 141 and 142, the two reflected beams may be expressed as:

$$E_2'(t) = \frac{\sqrt{T} \sqrt{\alpha_1} E_0}{\sqrt{2}} A(t) e^{i\omega t},$$

and $$E_3'(t) = \frac{\sqrt{\alpha_2} E_1}{\sqrt{2}} A(t-\tau) e^{i\omega(t-\tau)},$$

where T is the power attenuation factor of the adjustable optical attenuator 130 in the fiber 111, and τ is the relative delay between the two arms, i.e., the fibers 111 and 112. The output electric field at the output port of the coupler 110 that connects to the output fiber 150 may be written as:

$$E_4(t) = \frac{\sqrt{\alpha_1}}{\sqrt{2}} E_2'(t) + \frac{\sqrt{\alpha_2}}{\sqrt{2}} E_3'(t) = \frac{E_0}{2} \left[ \sqrt{T} \, \alpha_1 A(t) e^{i\omega t} + \alpha_2 A(t-\tau) e^{i\omega(t-\tau)} \right].$$

The corresponding power in the output fiber 150 is:

$$P_o = |\overline{E_4(t)}|^2 = \frac{E_0^2}{4} |\sqrt{T} \, \alpha_1 A(t) e^{i\omega t} + \alpha_2 A(t-\tau) e^{i\omega(t-\tau)}|^2$$

$$= \frac{E_0^2}{4} \left[ T\alpha_1^2 \overline{A^2(t)} + \alpha_2^2 \overline{A^2(t-\tau)} + 2\sqrt{T} \, \alpha_1 \alpha_2 \cos(\omega\tau) \overline{A(t)A(t-\tau)} \right]$$

$$= \frac{E_0^2}{4} \left[ T\alpha_1^2 + \alpha_2^2 + 2\sqrt{T} \, \alpha_1 \alpha_2 \overline{A(t)A(t-\tau)} \cos(\omega\tau) \right],$$

wherein the last expression is obtained under the following assumption:

$$\overline{A^2(t)} = \overline{A^2(t-\tau)} = 1$$

Notice that the cross-term represents the interference between the light beams in the two fiber arms 111 and 112 and is processed to extract spectral information in the input light in the fiber 101.

Next, the FFT results of the output in the fiber 150 is computed. Initially, the following relationship is defined:

$$\overline{A(t)A(t-\tau)} = \int_{-\infty}^{+\infty} A(t) A(t-\tau) e^{-i\omega t} dt.$$

The FFT operation is then given by:

$$FFT = F[\overline{A(t)A(t-\tau)}] = \int_{-\infty}^{\infty} \int_{-\infty}^{\infty} A(t) A(t-\tau) e^{-i\omega t} d\tau dt,$$

and $$F(\omega) = F[\overline{A(t)A(t-\tau)}] = \int_{-\infty}^{\infty} \int_{-\infty}^{\infty} A(t) A(t-\tau) e^{-i\omega t} d\tau dt,$$

Assuming the coupler 110 and the attenuator 130 are configured to satisfy $T\alpha_1=\alpha_2=\alpha$, the following expression for the power can be obtained:

$$P_0 = \frac{E_0^2 \alpha^2}{2}[1 + \overline{A(t)A(t-\tau)}\cos\omega t].$$

This power signal is then processed by the FFT device 180 to obtain the spectral information of the input signal.

For a signal with a noise background of $\delta E_0$, the signal can be represented by:

$$E_{in}(t) = E_0[A(t)e^{i\omega t} + \delta].$$

The corresponding output power in the fiber 150 is $$P_0 = \frac{E_0^2 \alpha^2}{2}[1 + \delta^2 + \overline{A(t)A(t-\tau)}\cos\omega t].$$

Hence, it is evident that the background noise can reduce the visibility of the interferometer.

If more than one channels are input to the device 100 in FIG. 1, the signals may be expressed as follows for the example of two channels at frequencies $\omega_1$, and $\omega_2$, respectively:

$$E_{in}(t) = E_1 A_1(t)e^{i\omega_1 t + \delta_1(t)} + E_2 A_2(t)e^{i\omega_2 t + \delta_2(t)},$$

where $\delta_1(t)$ and $\delta_2(t)$ represent their different phases. Accordingly, the signals may be written as follows:

$$E_2'(t) = \frac{\alpha}{\sqrt{2}}[E_1 A_1(t)e^{i\omega_1 t + \delta_1(t)} + E_2 A_2(t)e^{i\omega_2 t + \delta_2(t)}];$$

$$E_3'(t) = \frac{\alpha}{\sqrt{2}}[E_1 A_1(t-\tau)e^{i\omega_1(t-\tau)+\delta_1(t-\tau)} + E_2 A_2(t-\tau)e^{i\omega_2(t-\tau)+\delta_2(t-\tau)}];$$

and $$E_4(t) = \frac{\alpha}{2}[E_1 A_1(t)e^{i\omega_1 t + \delta_1(t)} + E_1 A_1(t-\tau)e^{i\omega_1(t-\tau)+\delta_1(t-\tau)} + E_2 A_2(t)e^{i\omega_2 t + \delta_2(t)} + E_2 A_2(t-\tau)e^{i\omega_2(t-\tau)+\delta_2(t-\tau)}]$$

The power of the output beam can be represented by the following:

$$|E_4(t)|^2 = \frac{\alpha^2}{2}[E_1^2 + E_1^2 A_1(t) A_1(t-\tau)\mathrm{Re}[e^{i\omega_1\tau+i\delta_1(t)-i\delta_1(t-\tau)}] + E_2^2 + E_2^2 A_2(t-\tau)\mathrm{Re}[e^{i\omega_2\tau+i\delta_2(t-\tau)}]].$$

This signal is fed into the FFT device 180 to extract the spectral information of the input light. The above equation indicates that the spectral resolution of the device 100 is a function of the maximum value of the relative delays between two fiber arms 111 and 112, $\tau_{max}$, which is inversely proportional to the linewidth $\Delta v$ of the input light:

$$\tau_{max} \propto \frac{1}{\Delta v}.$$

As an example, if the maximum relative delay is 100 ps, the maximum linewidth of the input light is about 10 GHz.

Figure 2:
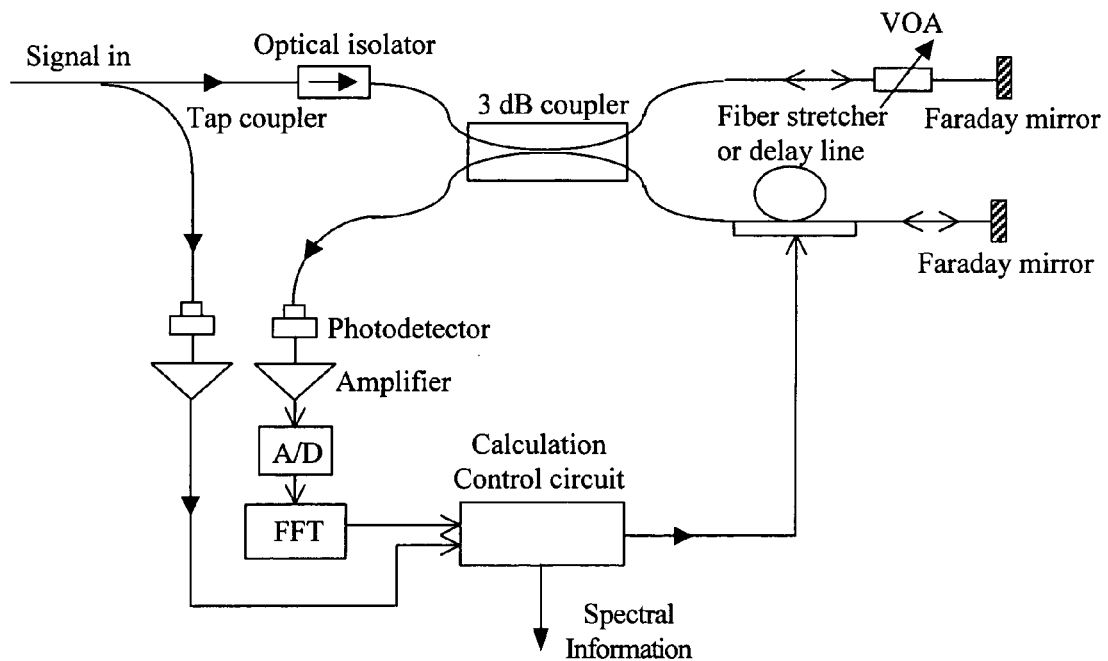
FIG. 2 illustrates an exemplary implementation of a spectral monitoring device based on the design in FIG. 1.

FIG. 2 illustrates an exemplary implementation of a spectral monitoring device based on the design in FIG. 1. An electronic control circuit is used to receive the output signals from the detectors 190 and the FFT device 180 to generate the control signal 122 for tuning the relative delay between the two fiber arms 111 and 112. The tuning of the relative delay and the FFT processing are synchronized to generate the spectral information for monitoring. Two signal amplifiers may be used to amplify the detector signals from the two detectors 190 and 160.

The above spectral monitoring devices and technique provide a simple and reliable device design at low cost and yet allow for real-time, high-resolution spectral monitoring operation. Such devices may be implemented with fiber-based designs which can be used for easy deployment in fiber optical systems. In addition, the devices based on the above designs may be packaged in a compact and robust configuration to allow for ease and convenience for diversified applications.

Only a few implementations are disclosed. However, it is understood that variations and enhancements may be made without departing from the spirit of and are intended to be encompassed by the following claims.

What is claimed is:

1. A device, comprising:
    an input fiber to receive input light;
    an output fiber;
    a first fiber;
    a second fiber;
    a fiber coupler having a first port coupled to said input fiber and said output fiber, and a second port coupled to said first and said second fibers to split said input light into a first beam in said first fiber and a second beam in said second fiber and to mix and couple optical signals from said first and said second fibers into said output fiber;
    a first reflector coupled to said first fiber to reflect said first beam back to said fiber coupler;
    a second reflector coupled to said second fiber to reflect said second beam back to said fiber coupler;
    a fiber tuning mechanism coupled to at least one of said first and said second fibers to change a relative delay in said first and said beams upon reflection to back said fiber coupler;
    an optical detector coupled to receive light from said output fiber to produce a detector output having information on optical interference between said first and said second beams received at said fiber coupler;
    an analog-to-digital converter coupled to convert said detector output into a digital signal; and
    a processing device receiving and performing a FFT processing on said digital signal to extract spectral information in said input light.

2. The device as in claim 1, further comprising a control circuit coupled to said processing device and to said fiber tuning mechanism to synchronize said FFT processing with a tuning in said relative delay.

3. The device as in claim 2, further comprising:
a tap fiber coupler in said input fiber to split a reference beam from said input light; and
a reference detector to convert said reference beam into a power indicating signal indicative of a power variation in said input light, wherein said control circuit is coupled to receive said power indicating signal and calibrates said FFT processing to account for a power variation in said input light.

4. The device as in claim 1, further comprising a variable optical attenuator in at least one of said first and said second fibers to control a relative optical power levels in said first and said second fibers.

5. The device as in claim 1, wherein each of said first and said second reflectors is a Faraday rotator reflector.

6. The device as in claim 5, wherein each Faraday rotator reflector includes a 45-degree Faraday rotator and a reflector.

7. A method, comprising:
splitting an input optical signal into first and second optical signals in first and second optical paths, respectively;
reflecting each of the first and second optical signals back with polarization in reflection to be orthogonal to polarization of light prior to reflection;
spatially overlaping reflected first and second optical signals to interfere with each other to produce a mixed output optical signal;
converting the mixed output optical signal into an electronic signal; and
applying a fast Fourier transform (FFT) on the electronic signal to extract spectral information in the input optical signal.

8. The method as in claim 7, further comprising using a Faraday rotator reflector to perform the reflecting of each of the first and second optical signals.

9. The method as in claim 7, further comprising using optical fiber to guide each optical signal.

10. The method as in claim 7, further comprising adjusting at least one of the first and the second optical paths to change a difference in the optical path lengths of the first and the second optical paths in response to the spectral information from the FFT.

11. The method as in claim 7, further comprising adjusting a power level of at least one of the first and second optical signals.

12. The method as in claim 7, further comprising:
monitoring a variation in the input optical signal; and
using the variation in the FFT to produce the extracted spectral information that accounts for the variation.

13. A device, comprising:
an optical coupler to receive an input optical signal and to split the input optical signal into a first optical signal and a second optical signal;
a first optical path to receive the first optical signal from the optical coupler, the first optical path comprising a first reflector that reflects light back and makes polarization of reflected light to be orthogonal to polarization of light incident to the first reflector prior to reflection;
a second optical path to receive the second optical signal from the optical coupler, the second optical path comprising a second reflector that reflects light back and makes polarization of reflected light to be orthogonal to polarization of light incident to the second reflector prior to reflection, wherein the optical coupler combines and mixes reflections of the first and the second optical signals to produce an optical output signal having interference information between the reflections
an optical detector coupled to receive the optical output signal from the optical coupler and produces an electronic signal from the optical output signal; and
a processing circuit to perform a fast Fourier transform on the electronic signal to extract spectral information in the input optical signal.

14. The device as in claim 13, further comprising an optical attenuator in at least one of the first and second optical paths to adjust a relative power level of one of the first and the second optical signals relative to another.

15. The device as in claim 13, further comprising an adjustment device in at least one of the first and second optical paths that adjusts a difference in optical path lengths of the first and second optical paths.

16. The device as in claim 15, wherein the adjustment device is coupled to receive output from the processing circuit and is operable to adjust the difference in response to the output.

17. The device as in claim 13, wherein the first reflector comprises a Faraday rotator and a reflector.

* * * * *